Nov. 9, 1971 W. WILLIMEK ET AL 3,618,191
METHOD OF PRODUCING THE LONGITUDINAL GROOVES
IN A SYNCHRONOUS SWIVEL JOINT
Filed Nov. 20, 1969 4 Sheets-Sheet 1
FIG. 1
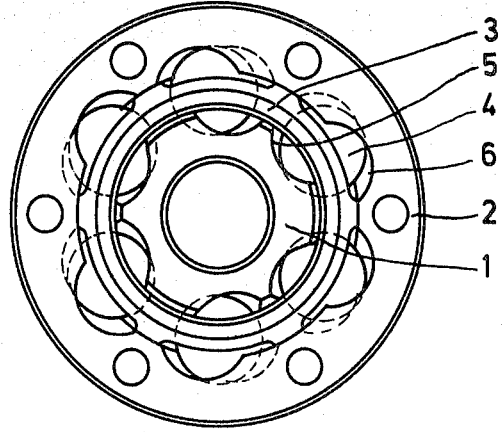
FIG. 2
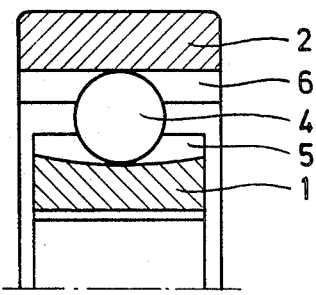
FIG. 3
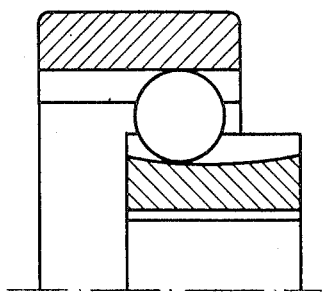
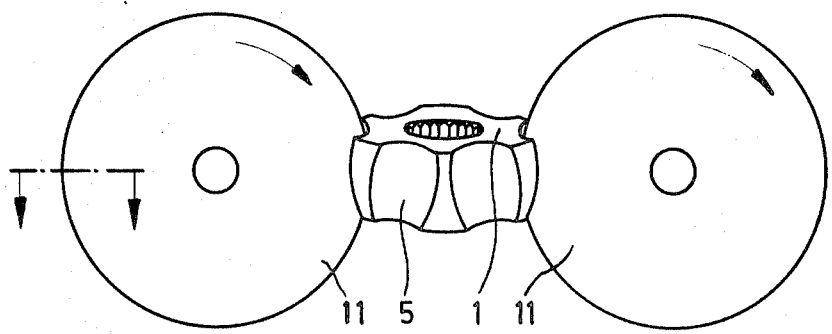
FIG. 5
INVENTORS
SOBHY LABIB GIRGUIS
WALTHER WILLIMEK
BY ERICH AUCKTOR
Nolte & Nolte
ATTORNEYS Nov. 9, 1971         W. WILLIMEK ET AL         3,618,191
       METHOD OF PRODUCING THE LONGITUDINAL GROOVES
              IN A SYNCHRONOUS SWIVEL JOINT
Filed Nov. 20, 1969                    4 Sheets-Sheet 4

INVENTORS
SOBHY LABIB GIRGUIS
WALTHER WILLIMEK
BY ERICH AUCKTOR

Nolte & Nolte
ATTORNEYS 3,618,191
METHOD OF PRODUCING THE LONGITUDINAL
GROOVES IN A SYNCHRONOUS SWIVEL JOINT
Walther Willimek and Erich Aucktor, Offenbach, and
Sobhy Labib Girguis, Troisdorf, Germany, assignors to
Lohr & Bromkamp GmbH, Offenbach am Main, Germany
Filed Nov. 20, 1969, Ser. No. 878,329
Claims priority, application Germany, Nov. 21, 1968,
P 18 10 177.4
Int. Cl. B21h 1/12; B23p 11/00, 13/04
U.S. Cl. 29—148.4 R          4 Claims

ABSTRACT OF THE DISCLOSURE

There is disclosed a process of producing a synchronous swivel joint of the kind having two joint members each with longitudinal grooves of which the grooves of one joint member are paired with those of the other member. In such a joint, balls are located in the pairs of grooves and transmit torque between the members and the members are axially displaceable so that the balls are displaced along the grooves towards the ends thereof. First the grooves of the members are conventionally machined and hardened and then they are lapped over an area extending outwards from the center of the grooves towards the ends of the grooves to ensure accurate operation of the assembled joint.

---

Commonly assigned copending application Ser. No. 749,462, filed Aug. 1, 1968, now issued as Pat. 3,475,924 on Sept. 14, 1966 relates to a synchronous swivel joint in which the one joint member is displaceable axially to the other joint member and balls serve to transfer the torque. The balls are disposed in pairs of grooves having longitudinal center lines which cross and are disposed in such a manner that, upon a displacement of the one joint member from its center position in relation to the other joint member in the one or the other direction, the points of contact between the balls and the mutually facing grooves come increasingly closer together, i.e., the guiding cross section formed by the pairs of grooves for the balls narrows constantly in both of the directions of displacement from the central normal position of the joint member.

Now, experience has shown that, after the joint members have undergone the final machining, in which the longitudinal grooves are made by broaching, drilling milling or the like, they distort undesirably in the hardening operation by a few thousandths to a few hundredths of a millimeter, to such an extent that the points of contact between the balls and the diametrically facing grooves are farther apart at one or both ends of the displacement than in the center, which is contrary to the result desired; in other words, the guiding cross section formed by the pairs of grooves for the guidance of the balls constantly widens in one or even in both of the directions of the displacement from the normal central position of the joint.

For the achievement of the desired pinching of the balls at the ends of the mutual displacement of the joint members, which is described in the aforesaid application, only very slight deviations of the longitudinal center lines from their normal course are necessary, and in fact deviations on the order even of only a few hundredths of the diameter of the torque-transmitting balls are sufficient.

A simple method of reliably achieving the desired pinching of the balls at the ends of the mutual displacement of the two joint members is provided according to the present invention. Specifically, the grooves in both joint members are first produced in a conventional manner by broaching, drilling, milling or the like, and then, according to the invention, after the joint members are hardened, the grooves of one or both joint members are lapped with a shaped lapping disc in such a manner that the lapped area running out from the center of the length of the groove towards the ends of the groove extends just beyond the length over which the balls travel within the groove when the mutual displacement of the joint members is maximum.

The invention is further explained hereinbelow with reference to exemplary embodiments thereof represented diagrammatically in the drawings, in which:

FIG. 1 is a side elevation;

FIG. 2 is a partial longitudinal section on a somewhat larger scale of a synchronous swivel joint constructed according to the aforementioned application;

FIG. 3 is a partial longitudinal section corresponding to FIG. 2 after a mutual displacement of the two joint bodies to a terminal position;

FIG. 5 shows the principle of operation of an apparatus for the practice of the method of the invention.

Figure 4:
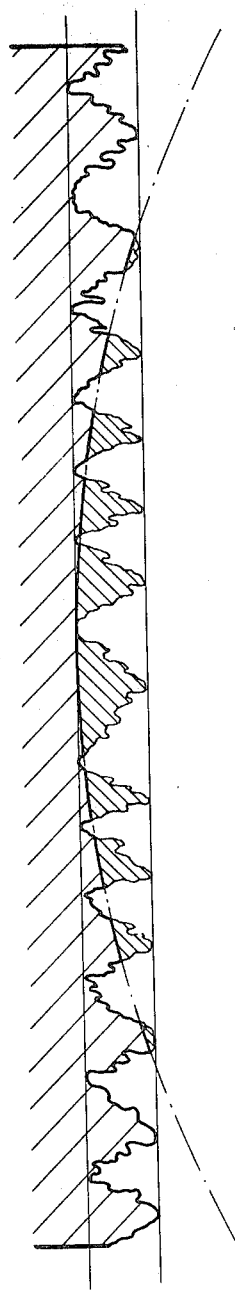
FIG. 4 is an imaginary longitudinal section through the bottom of a longitudinal groove machined by the method of the invention.

The synchronous swivel joint of FIG. 1 consists of an inner joint member 1 and an outer joint member 2 as well as balls 4 which are held in a cage 3 and which engage in longitudinal grooves 5 and 6 in the inner and outer joint member in order to transfer the torque from one joint member to the other joint member.

In FIG. 2, in which a pair of longitudinal grooves 5 and 6 disposed along helical lines in joint members 1 and 2 and cooperating with the same ball 4 is shown collapsed into the plane of the drawing, the longitudinal center line of groove 5 of the inner joint member deviates from the helical line in that the longitudinal center line is at a greater distance from the axis of the joint member towards the ends of joint member 1 than it is in the center of its length. The result of this deviation is that, as represented in FIG. 3, at the ends of the mutual displacement of the joint members the points of contact between the balls and the mutually facing grooves come increasingly closer together, that is, the balls are pinched at the ends of the displacement and a restoring force is produced which increases towards the ends of the travel and which tends to force the joint members back to their mutual axial center position.

According to the invention, this deviation of the longitudinal center lines of grooves 5 is produced in the joint members by lapping the grooves which have been produced in the conventional manner by broaching, drilling, milling or the like, and then hardened, this lapping being performed in the center of the length of the groove with a lap having the profile of the groove cross section, as represented in principle in FIG. 4, in such a manner that the lapped zone running out from the center of the length towards the ends of the groove runs just beyond the length which the balls travel in the grooves when the mutual displacement of the joint members is maximum. In this process, as represented in principle in FIG. 4, the irregularities remaining in the surface of the longitudinal grooves from the broaching, drilling, milling or the like operations, are at least partially lapped away in the center, while towards the ends of the lapped area the irregularities are less and less worn away, so that towards the end of the lapped area the desired pinching of the balls is produced, which has the tendency to force the balls back towards the center of the lapped area.

The representation in FIG. 4 is, of course, only imaginary and does not represent an enlargement to scale of a longitudinal section through a groove machined according to the invention.

The desired lapped area running out from the center of the length of the groove towards the extremities can be obtained either by using a lap having such a diameter that the desired lapped area is obtained merely by the radial plunging of the lap into the groove, or the desired lapped zone can be obtained with a lap of smaller diameter which is guided along a track having the appropriate curvature.

FIG. 5 illustrates the principle of the construction of an apparatus for the practice of the method. While the inner joint member 1 is held fast on the apparatus, two opposite longitudinal grooves 5 in the joint member are lapped simultaneously, each by a lap 11 having the profile of the longitudinal grooves. In this arrangement, the lapping pressures of the two laps 11 compensate one another, so that the greatest accuracy is achieved.

According to an additional feature of the invention, it is advantageous to use a lap containing grits bonded with a resilient material such as rubber or other synthetic material. This type of lap has the advantage that it adapts itself automatically, on account of the resilience of the rubber, to the various cross sections of the grooves within the desired tolerances, and retains the correct profile even as it wears away.

Figure 6:
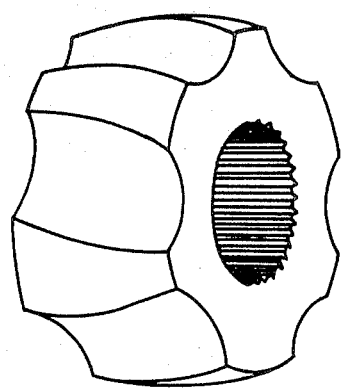
FIGS. 6 to 9 each show joint members of synchronous swivel joints of types different from those of the aforementioned application, to which the method of the invention is applicable.
Figure 7:
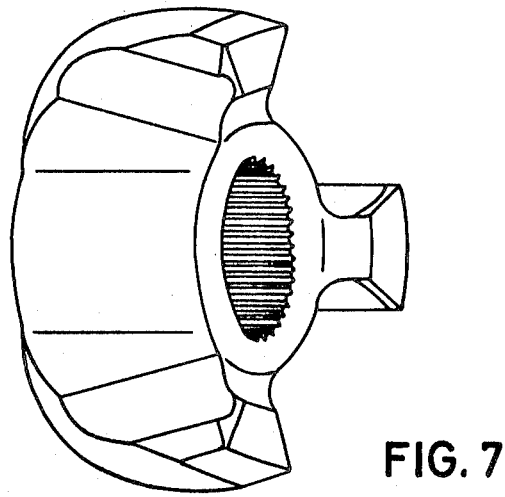
Figure 8:
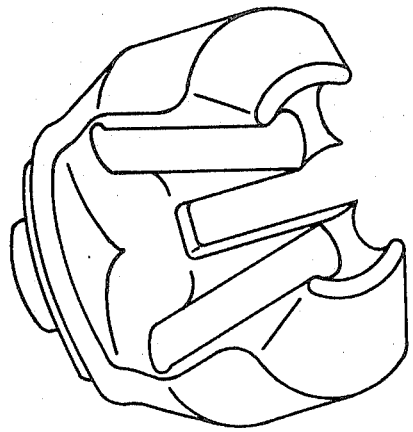
Figure 9:
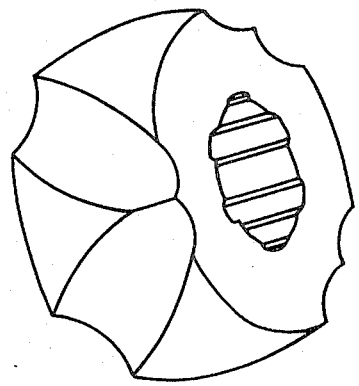

FIG. 6 shows the inner joint member of a synchronous swivel joint according to German Pat. No. 1,211,871, which has longitudinal grooves machined in the manner of the present invention. The invention, however, is not limited to synchronous swivel joints of this type of construction, and can be used just as well even in the case of synchronous swivel joints of entirely different types in which an axial mutual displacement of the joint members is possible. Thus, for example, FIG. 7 shows the inner joint member of a synchronous swivel joint according to German Pat. No. 1,229,343; FIG. 8 shows one of two identical joint members of a synchronous swivel joint according to German Petty Pat. No. 1,846,435, and FIG. 9 shows the inner joint member of a synchronous swivel joint according to German Pat. No. 1,168,177; to each of these joint members the method of the present invention is applicable.

When a synchronous swivel joint having joint members capable of mutual axial displacement has an inner joint member and an outer joint member enveloping the inner one, the deviations in the alignment of the longitudinal grooves that are required for the desired squeeze or pinch effect can be made most easily on the inner joint member by lapping with a shaped lapping disc. In principle, however, the process can be performed on the longitudinal grooves in the outer joint member by means of a shaped lap guided along a guiding track, or it can be performed on the longitudinal grooves of both joint members although this is usually unnecessary.

What is claimed is:

1. Method for producing the longitudinal grooves in at least one joint member of a synchronous swivel joint comprising two joint members each of which is provided with longitudinal grooves and also comprising a plurality of balls and in which the joint has a center position and at least one of the joint members is displaceable away from the center position axially relative to the other and the balls serve for torque transfer, the grooves facing one another in pairs, the balls being engaged in said pairs of grooves, and the grooves having longitudinal center lines extending in such a manner that, upon an axial displacement of one of the joint members away from the center position the points of engagement between the balls and the facing grooves come increasingly closer together, the method comprising machining the grooves in the joint member, hardening the joint member, lapping the grooves over an area extending out from the center of the lengths towards the ends of the grooves just beyond the roll path of the balls in the grooves upon the maximum possible displacement of the joint body relative to the other joint body.

2. Method according to claim 1, in which the grooves are lapped to a degree which is at a maximum at about the centers of the grooves and progressively decreases outwardly from the centers of the grooves towards the ends of the lapped areas.

3. Method according to claim 2, in which the lapping comprises driving a lapping disc about an axis substantially perpendicular to the longitudinal axis of the groove being lapped and engaging the periphery of the lapping disc with the center of the groove.

4. Method according to claim 2, in which the working surface of the lapping disc comprises a resilient material having lapping grits bonded thereto.

References Cited

UNITED STATES PATENTS 3,262,185    7/1966    Hornigold _____ 29—148.4 R

THOMAS H. EAGER, Primary Examiner

U.S. Cl. X.R.

29—148.4 A, 558